(12) United States Patent
Peterka et al.

(10) Patent No.: US 9,847,979 B2
(45) Date of Patent: Dec. 19, 2017

(54) SECURITY AND KEY MANAGEMENT OF DIGITAL CONTENT

(71) Applicant: Verimatrix, Inc., San Diego, CA (US)

(72) Inventors: Petr Peterka, San Diego, CA (US);
Niels Thorwirth, San Diego, CA (US);
Kamil Saykali, San Diego, CA (US);
Ali Hodjat, San Diego, CA (US); Steve Christian, San Diego, CA (US);
Nikolai Keychenko, San Diego, CA (US); Tom Pollard, San Diego, CA (US)

(73) Assignee: VERIMATRIX, INC., San Diego, CA (US)

( * ) Notice: Subject to any disclaimer, the term of this patent is extended or adjusted under 35 U.S.C. 154(b) by 0 days.

(21) Appl. No.: 14/048,970

(22) Filed: Oct. 8, 2013

(65) Prior Publication Data
US 2014/0281489 A1 Sep. 18, 2014

Related U.S. Application Data

(60) Provisional application No. 61/799,395, filed on Mar. 15, 2013.

(51) Int. Cl.
*H04L 29/06* (2006.01)
*H04L 29/08* (2006.01)
(Continued)

(52) U.S. Cl.
CPC ............ *H04L 63/0464* (2013.01); *G09C 5/00* (2013.01); *H04L 9/0866* (2013.01);
(Continued)

(58) Field of Classification Search
None
See application file for complete search history.

(56) References Cited

U.S. PATENT DOCUMENTS

| 6,069,647 A * | 5/2000 | Sullivan et al. ................. 725/29 |
| 2003/0002581 A1* | 1/2003 | Moni ................... H04N 19/176 |
| | | 375/240.03 |

(Continued)

FOREIGN PATENT DOCUMENTS

| EP | 2116915 A1 | 11/2009 |
| WO | 2006078124 A1 | 7/2006 |

OTHER PUBLICATIONS

International Search Report and Written Opinion for related international patent application No. PCT/US2014/023571, dated Jul. 17, 2014, in 9 pages.

(Continued)

*Primary Examiner* — Kaveh Abrishamkar
(74) *Attorney, Agent, or Firm* — Procopio, Cory, Hargreaves & Savitch LLP

(57) ABSTRACT

Managing access to digital content within a particular domain, including: receiving the digital content at a first client device; decrypting the received digital content at the first client device using a first key; transcoding the digital content to another format; re-encrypting the transcoded content using a second key, wherein the second key is obtained by one of: (1) directly from a server; or (2) indirectly by deriving it locally based on information received from the server; and transmitting the re-encrypted content to a second client device, wherein the second client device obtains the second key and decrypts the re-encrypted content at the second client device.

21 Claims, 14 Drawing Sheets

(51) Int. Cl.
  *H04W 4/18*      (2009.01)
  *H04N 21/4408*   (2011.01)
  *H04N 21/4627*   (2011.01)
  *G09C 5/00*      (2006.01)
  *H04L 9/08*      (2006.01)

(52) U.S. Cl.
  CPC ..... *H04L 67/2823* (2013.01); *H04N 21/4408* (2013.01); *H04N 21/4627* (2013.01); *H04W 4/18* (2013.01); *H04L 2209/60* (2013.01); *H04L 2209/76* (2013.01)

(56) References Cited

U.S. PATENT DOCUMENTS

| | | | |
|---|---|---|---|
| 2003/0204738 A1* | 10/2003 | Morgan | 713/194 |
| 2004/0158721 A1* | 8/2004 | Candelore | H04N 7/163 713/182 |
| 2004/0264803 A1* | 12/2004 | Castillo | H04N 21/234309 382/276 |
| 2005/0071278 A1* | 3/2005 | Simelius | 705/52 |
| 2006/0020786 A1 | 1/2006 | Helms et al. | |
| 2006/0123246 A1 | 6/2006 | Vantalon et al. | |
| 2006/0136718 A1 | 6/2006 | Moreillon | |
| 2006/0233363 A1 | 10/2006 | Graunke | |
| 2008/0235746 A1* | 9/2008 | Peters | H04N 7/17318 725/111 |
| 2008/0247541 A1 | 10/2008 | Cholas et al. | |
| 2008/0267411 A1 | 10/2008 | Peterka et al. | |
| 2009/0207918 A1* | 8/2009 | Fan | H04N 21/440218 375/240.23 |
| 2009/0285391 A1 | 11/2009 | Johnson et al. | |
| 2010/0058405 A1* | 3/2010 | Ramakrishnan | H04N 7/17318 725/97 |
| 2010/0166060 A1* | 7/2010 | Ezure | H04N 19/176 375/240.03 |
| 2010/0310076 A1 | 12/2010 | Barzilai et al. | |
| 2011/0289309 A1 | 11/2011 | Tanenbaum et al. | |
| 2011/0299683 A1* | 12/2011 | Candelore | 380/255 |
| 2012/0079527 A1* | 3/2012 | Trimper | H04N 21/47202 725/31 |
| 2012/0137332 A1 | 5/2012 | Kumar | |
| 2012/0246462 A1* | 9/2012 | Moroney | H04L 63/10 713/151 |
| 2012/0323986 A1* | 12/2012 | Sayko | H04N 21/222 709/201 |
| 2013/0133010 A1* | 5/2013 | Chen | H04N 21/482 725/61 |
| 2014/0025848 A1* | 1/2014 | Bisgrove | G06F 13/10 710/33 |

OTHER PUBLICATIONS

Extended European Search Report for related EP Patent Application No. 14768975.6, dated Sep. 5, 2016, in 8 pages.

* cited by examiner

SECURITY AND KEY MANAGEMENT OF DIGITAL CONTENT

CROSS-REFERENCE TO RELATED APPLICATIONS

This application claims the benefit of priority under 35 U.S.C. §119(e) of U.S. Provisional Patent Application No. 61/799,395, filed Mar. 15, 2013, entitled "Systems and Methods for Security and Key Management with Video Content Transcoding". The disclosure of the above-referenced application is incorporated herein by reference.

BACKGROUND

Field of the Invention

The present invention relates to digital content, and more specifically, to managing access to and protecting digital content.

Background

The delivery, storage, and consumption of digital video content continue to rapidly increase. The video content may be in different formats for the various devices used. For example, content may be stored on a digital video recorder (DVR) in a high-definition resolution that has a correspondingly high bitrate. The content may then be played on a smart phone that lacks the ability to display the content in high-definition format or lacks the ability to receive that data at the correspondingly high bitrate. The gap between the high-definition format and the abilities of the smart phone may be bridged by transcoding the video to a lower definition resolution and lower bitrate at the DVR before streaming the content to the smart phone for display. A user may be authorized to store, distribute, or display different video content at different times, for different numbers of times, in different formats, and on different devices, for example, as limited by the owners of the video content. Allowing many devices to be used while maintaining rights control is difficult. Communications over multiple types of channels, including asymmetric channels, increases the difficulty of maintaining rights control.

SUMMARY

Systems and methods for protecting digital content are provided. The systems and methods can enable a set-top box (STB) gateway (e.g., digital video recorder (DVR), residential gateway (RGW), or similar device) to decrypt protected content, transcode it to another format (e.g., HTTP live streaming (HLS) or moving picture experts group-dynamic adaptive streaming over HTTP (MPEG-DASH)). The STB gateway may request re-encryption keys from the head end (e.g., a video content authority system (VCAS)). Note that the term head end and server may be used interchangeably throughout this document. The transcoded and re-encrypted content can then be shared with client devices (e.g., mobile devices or tablets). A digital living network alliance (DLNA) can be used to assist in discovering DVR content and can signal capabilities of the client device to the STB gateway. The client device may request decryption keys from the head end, and the head end can verify the device's domain membership and content entitlement before delivering keys to the device. The system operator can thereby control which devices and what content may be shared. Additionally, domain management (e.g., size of a domain, device type and specific device list) and rights management (e.g., what content can be shared, how long the content can stay on the DVR and under what conditions) may be performed by the head end rather than the home network or individual devices.

In one aspect, the invention provides a method that includes delivering content to a first client device, decrypting the content at the first client device using a first key, transcoding the decrypted content, re-encrypting the transcoded content using a second key, delivering the re-encrypted content to a second client device, the second client device connecting to a server to retrieve the second key, and decrypting the re-encrypted content at the second client device.

In one embodiment, the first client device is an STB gateway. In one embodiment, the second key is bound to devices within a domain. In another embodiment, the second key is derived by the first client device and the server. In another embodiment, the second key is derived at least in part using a domain ID associated with the domain and the first key. In yet another embodiment, the second key is derived at least in part using a time value and the first key.

In one embodiment, re-encrypting the transcoded content uses a different digital rights management (DRM) than the DRM used for decrypting the content using the first key. In one embodiment, the method further includes the first client device modifying copy control parameters associated with the content. In one embodiment, the second client device connects to the head end to retrieve the second key via the first client device.

In one embodiment, the method further includes the first client device embedding a watermark in the transcoded content. In a further embodiment, the watermark includes information received from the head end. The watermark may be unique to the first device or to the second device or to the domain.

In one embodiment, the keys are derived on the first client device using a hardware implemented mechanism including a unique key. In an embodiment, the keys are derived on the second client device using a hardware-implemented mechanism including a unique key. In a further embodiment, the hardware-implemented mechanism is a key ladder.

Other features and advantages of the present invention should be apparent from the present description which illustrates, by way of example, aspects of the invention.

BRIEF DESCRIPTION OF THE DRAWINGS

The details of the present invention, both as to its structure and operation, may be gleaned in part by study of the appended further drawings, in which like reference numerals refer to like parts, and in which.

DETAILED DESCRIPTION

As described above, digital content may be in different formats for the various devices used. However, allowing many devices to be used while maintaining rights control is difficult. Communications over multiple types of channels, including asymmetric channels, increases the difficulty of maintaining rights control. Further, the content is often re-encrypted during recording. For example, the original content may be decrypted using a conditional access system that protected it during delivery to the DVR, and then the content is re-encrypted using a locally generated encryption key. This key is typically known only to the DVR. Content in the home can be shared using a link protection technology which may typically lose control of the content and the service provider cannot enforce domain rules and any additional digital rights rules after the content enters the home network.

Certain implementations as disclosed herein provide for managing access to and protecting digital content. After reading this description it will become apparent how to implement the invention in various implementations and applications. However, although various implementations of the present invention will be described herein, it is understood that these implementations are presented by way of example only, and not limitation. As such, this detailed description of various implementations should not be construed to limit the scope or breadth of the present invention.

Figure 1:
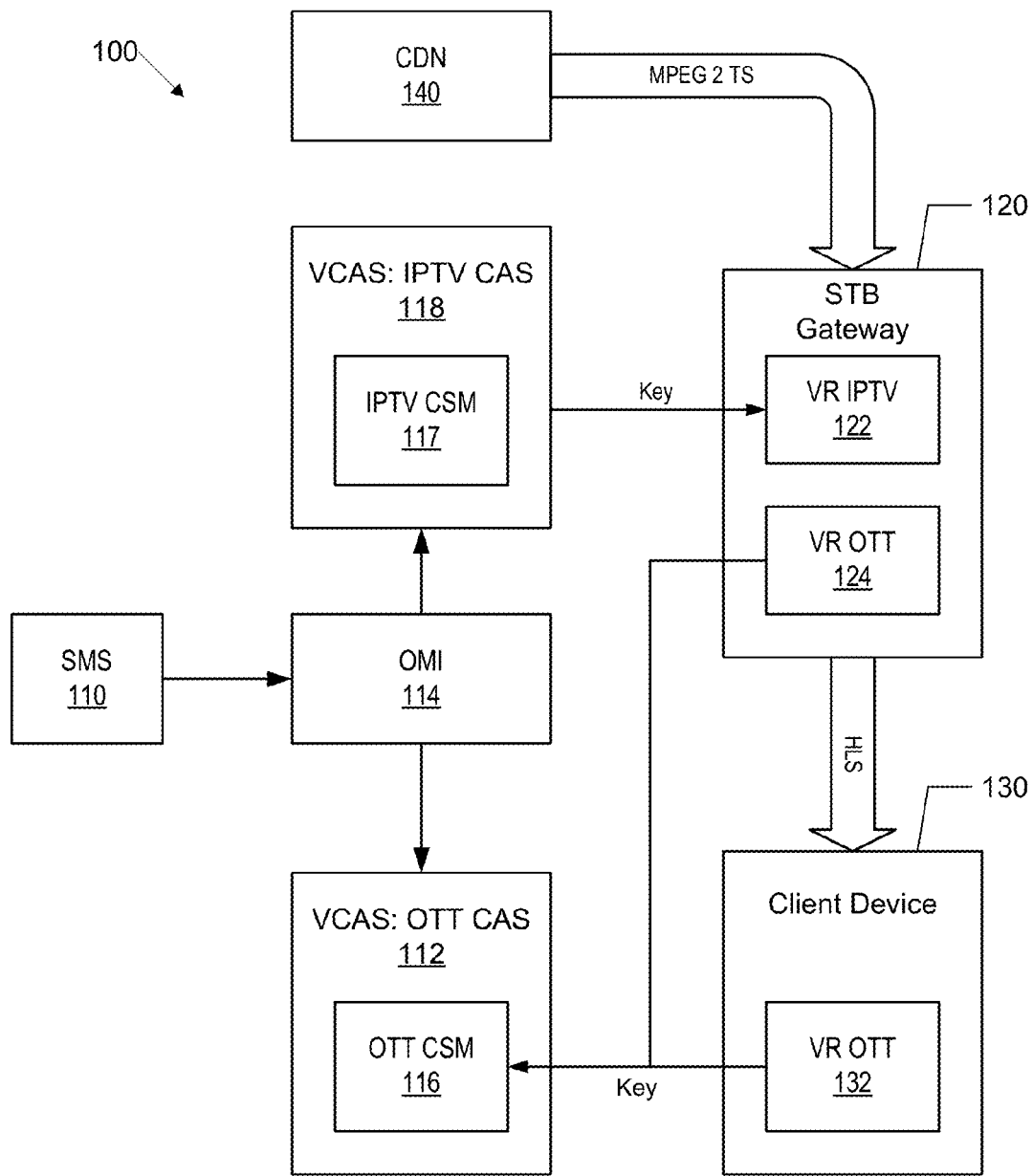
FIG. 1 is a functional block diagram of a system for managing access to video content in accordance with one embodiment of the present invention.

FIG. 1 is a functional block diagram 100 of a system for managing access to video content in accordance with one embodiment of the present invention. In the illustrated embodiment of FIG. 1, a subscriber management system (SMS) 110 communicates with a video content authority system (VCAS™) 112 or 118 via Operator Management Interface (OMI) 114, which provides the tools and support that digital TV operators require to address the new opportunities arising from the convergence of video delivery over various types of networks (whether managed or unmanaged) to a multitude of devices. In some embodiments, the VCAS is configured as a multimedia content authority system (MultiCAS) supporting multiple DRM systems. The communication, which includes descriptions of different assets, may be via a unified interface (e.g., an operator Management Interface (OMI) 114).

If the assets are associated with managed Internet Protocol television (IPTV) delivery, the VCAS IPTV sub-system (e.g., an IPTV content security manager (CSM) 117) will generate content encryption keys for the IPTV version of this asset. If the asset is intended for Over-the-Top Content (OTT) distribution (which describes broadband delivery of video and audio without a multiple system operator being involved in the control or distribution of the content itself), the VCAS OTT subsystem (e.g., the MultiRights and Adaptive CSM 116) generates and maintains content encryption keys for the OTT version of the asset. The OTT version of the asset, in one embodiment, is not created at that time as it may be created later on by the transcoding capability of an STB gateway 120. With OTT, the provider may be aware of the contents of the IP packets but is not responsible for, nor able to control, the viewing abilities, copyrights, and/or other redistribution of the content. This is in contrast to purchase or rental of video or audio content from an Internet provider, such as cable television Video on demand or an IPTV video service. OTT in particular refers to content that arrives from a third party, such as Netflix™ or Hulu™, and is delivered to an end user device, leaving the internet provider responsible only for transporting IP packets. In the above embodiment, the pay TV operator will have the ability to provide both managed content delivery (e.g., over cable, satellite, DSL, etc.) and unmanaged OTT delivery (e.g., over WiFi, 3G/4G, etc.).

The SMS 110 can also enter appropriate entitlements via the OMI interface 114. The entitlement can authorize a subscriber in various ways. For example, the subscriber (and associated devices) may be authorized for either the IPTV managed content delivery, transcoding ability in the gateway, consumption on portable (OTT) devices, or a combination of entitlements.

A set-top box (STB) gateway 120 efficiently and securely manages the format translation process for both incoming linear (broadcast) content streams and for local assets recorded on a DVR, and features a set of functions that enables the secure translation. In one embodiment, the STB gateway 120 can be configured as a proprietary ViewRight™ (VR) gateway. When the IPTV version of the asset is received from IPTV 118 by the STB gateway 120 and getting ready for transcoding (which may be in real time or from local DVR storage), the VR IPTV component 122 requests IPTV content encryption key from the VCAS CSM 117 to decrypt the content and the VR OTT component 124 requests the OTT asset content encryption key from the OTT CSM 116 in order to re-encrypt the content after transcoding. The decrypting, transcoding, and re-encrypting may be performed concurrently. Additionally, the VR IPTV 122 and VR OTT 124 may be logical functional components of a single process, separate libraries, or individual processes. The managed content (e.g., IPTV content) may be delivered, for example, to the STB gateway 120 via a DSL network, cable QAM network, DOCSIS channel, or in general via a content delivery network (CDN) 140. When the STB gateway 120 streams the content to a client device (e.g., an iOS tablet) 130, the VR OTT client 132 on the receiving device will request the OTT asset content decryption key from the OTT CSM 116 in order to decrypt, decode and render the content.

Figure 2:
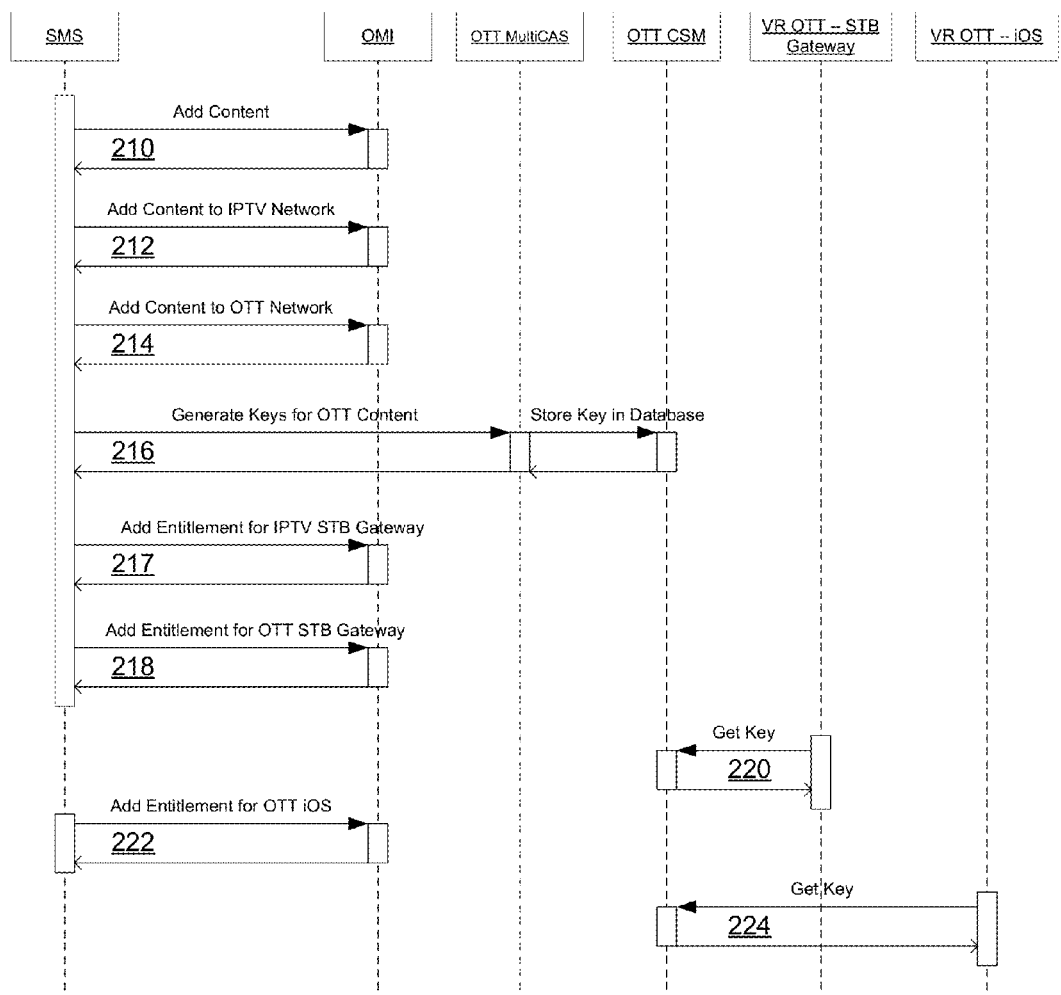
FIG. 2 is a flow diagram illustrating content protection methods described above with respect to FIG. 1.

FIG. 2 is a flow diagram 200 illustrating content protection methods described above with respect to FIG. 1. In the first illustrated communication 210, the SMS adds the content description to the VCAS via the OMI. In the second illustrated communication 212, the SMS adds the content information for IPTV delivery via the OMI. In the third illustrated communication 214, the SMS adds content information for OTT delivery via the OMI. In the fourth illustrated communication 216, the SMS triggers the generation of keys for the OTT content. In the fifth illustrated communication 217, the STB gateway's entitlements for the IPTV content is established and the key is supplied to the STB gateway when it needs it for content decryption. In the sixth 218 and seventh 220 illustrated communications, the STB gateway's entitlements for the OTT content are established and the key is supplied to the STB gateway when it needs it for transcoding and re-encryption. In the eighth 222 and ninth 224 illustrated communications, the client device's entitlements for the OTT content are established and the key is requested by the client device when it wants to play the content.

In one example system, the STB gateway 120 can store the video content in encrypted form as received from the head end. For delivery to client devices (e.g., device 130), the STB gateway 120 can decrypt the stored video content, transcode the decrypted video content to a different format, and re-encrypt the transcoded video content. The system can control decryption and re-encryption keys used with video content from a head end. Specifically, in one embodiment, the head-end includes a set of VCAS servers such as Content Security Manager (CSM) which manages the content encryption keys. Access to the video content can be managed without persistent storage of content keys on any devices in a subscriber's home.

As described above, Subscriber Management System (SMS) manages access to content. The system may include multiple SMSs, for example, SMSs for different content providers. The client device is generally a device that can display (or provide for display) video content. Example client devices include smart phones, tablets, personal computers, game consoles, and networked televisions. A home network may also be a business, organization, or other network. The STB gateway is generally a device that provides communication and storage for video and other content. The STB gateway may also be referred to as a DVR, PVR, set-top box, residential gateway (RGW). The STB gateway may also be considered a client device.

The system can retain control of the video content and, for example, limit access and distribution in various ways. For example, the content transcoded and re-encrypted by the STB gateway may be bound to a domain shared by a subscriber's devices. Additionally, the system may assign copy control information to the transcoded content. In one embodiment, the system operates without an IP return path from the STB gateway. In this case, the second key is delivered to the STB Gateway in the same ECM message together with the first key or in a separate ECM message.

A client device that is receiving content streamed from the STB gateway can switch to receiving the same content delivered over OTT when the subscriber leaves home with the client device. As described above, OTT may describe broadband delivery of video and audio without a multiple system operator being involved in the control or distribution of the content itself or without guaranteeing quality of service (e.g. delivery over DOCSIS). Consumers can access OTT content through internet-connected devices such as laptops, tablets, and smartphones. Thus, the system can interface with devices that operate with video in many different formats and with different digital rights management (DRM) systems.

Content encryption keys (CEKs) for content stored, transcoded, and redistributed by the STB gateway are controlled by the head end (also referred to as "the cloud"). Accordingly, a client device may request the CEK from the head end. The head end can authenticate the client device to verify that the client device has entitlements for the requested content. The entitlements may be based, for example, on domain membership and content rights. After authenticating the client device, the head end supplies the relevant CEK to the client device to allow playback of the content. The system can derive and bind these keys in various ways. For example, a key may be for a specific asset, a specific home domain, or a combination of these.

The content re-encryption keys, in an embodiment, are bound to specific asset IDs shared by a set of devices belonging to the same subscriber or a group of subscribers. When the content is also offered as streaming from the head end (e.g., VOD, network DVR, OTT) it can be advantageous to use the same key for the content locally recorded and transcoded in the home and for the streamed content. This can assist the head end in treating the content the same way and allocating the same rights to it. Additionally, this allows a device to start consuming the content in the home network from local storage (e.g., the STB gateway) and then transitioning to streaming the same content from the head end over a mobile network (e.g., 3G, 4G, LTE, public Wi-Fi, etc.) while using the same CEK.

The asset IDs can include a logical asset IDs and physical asset IDs. The logical asset ID (LAID) identifies a particular movie, program, or the like. The physical asset ID (PAID) is specific to a particular format. For example, content with a particular LAID may be received at a head end and made available in different formats, each format having a different PAID. The format, for example, can be for delivery over different networks (e.g., IPTV, OTT, 1-way DVB). Note that naming conventions may be used to ease the mapping between the PAIDs. For instance, the LAID can be "Movie 1", PAID1 may be "Movie 1; IPTV" and PAID2 may be "Movie 1; HLS". Each PAID may be assigned a unique CEK. The CEKs can be stored in a Key Management database (DB) associated with the CSM 116 or 117. Different keys allow maintaining different security levels for individual distribution networks such that, e.g., a key that has been compromised and allows decryption of medium quality content (e.g., HTTP live streaming (HLS)) cannot be used to decrypt higher quality content (e.g., IPTV).

Each client device has a unique Device ID (DevID). The DevID can be, for example, a MAC address used for communication with the device. Devices may also have unique Device Keys (DevK). As devices are associated with users and user accounts, they may also be associated with domains. Each domain has a unique Domain ID (DomID). Domains may also be assigned unique Domain Keys (DomK).

One use of identifiers and keys occurs when the STB gateway has stored content in a first format and is to transcode the content to a second format. The STB gateway submits a key request for the content in the first format (e.g., IPTV) content identified by PAID1. The head end verifies the entitlements and shares a first CEK (CEK1). The STB gateway can now send a request to the head end for the CEK needed for re-encryption. This time, the request will contain the PAID2 for the second format (e.g., HLS or MPEG-DASH). The head end will verify that the user has rights to transcode and share content in the home domain and issue a second CEK (CEK2). The STB gateway can initiate decryption using CEK1, transcoding, and re-encryption operation using CEK2.

Another use of identifiers and keys occurs when another client device in the home network wants to stream the transcoded content. The client device can discover the content (e.g., using Digital Living Network Alliance (DLNA) protocol) and initiate streaming the content in the second format. Since the content is encrypted, the client device issues a key request to the head end for PAID2 associated with the transcoded content. The head end will verify the rights (e.g., domain membership or the device's entitlements) and issue the CEK2 to the client device if the rights are verified.

The verification request to the head end may go from the client device through the STB gateway to request the CEK2. The head end will make the decision whether to issue the key but the STB gateway in the middle may be used as a gateway to the head end connection (e.g. a gateway with a DOCSIS modem and WiFi access point allowing the mobile client device to communicate to the head-end). The STB gateway may add information to the request, for example, to ensure that the client device is still in physical proximity to the STB gateway if content usage restrictions require this.

Another use of the system is to bind content encryption to a domain. For example, local content may be bound to a home domain (collection of devices used by the same user/family/subscriber). In this case, content may be shared within the domain but not outside of the domain or as a super-distribution business model. For example, the home domain cannot share content with friends (even if they are separately entitled to the same content). In this case, the STB gateway may request its domain key DomK from the head end. The head end will verify that the user has rights for domain sharing and if so, it will supply DomK to the STB gateway. The STB gateway may also receive its DomID from the head end. Using the DomK, the STB gateway may transcode and re-encrypt all content for which it is entitled to do so. When another device requests the transcoded content, the STB gateway will use the DomID as the key identifier. This will allow the device to request the DomK from the head end before playing the content. The head end will verify the domain membership of the device and issue the DomK if rights conditions are satisfied. This interaction may not be required for each asset.

The system may also be used with combined asset and domain based content protection. The system stores the CEK associated with a specific content/asset persistently in the key management DB and manages the CEK by the head end. When the key is provided for any of the devices associated with a single domain, it is modified on the fly such that only devices in the domain may use it to share content. Various functions may be used to modify the CEK. In one embodiment, a one-way function is used to prevent devices in the home domain from deriving the original CEK and thus jeopardizing the security of the content.

In one embodiment, when the STB gateway requests the CEK using the PAID2, the head end uses the CEK2 and DomID to derive a unique CEK-D1 for that domain. Since the head end knows to which domain the STB gateway belongs, it can determine the DomID. Similarly, when a client device requests the CEK using the PAID2, the head end will use both the CEK2 and DomID to derive a unique CEK-D1 for that domain. Again, since the head end knows to what domain the client device belongs, if another device (e.g., a neighbor's device) requests the same key using the PAID2, the head end will generate a different CEK-D2 which will not match the key used by the STB gateway to re-encrypt the content. Note that this method may dramatically decrease the storage requirement on the head end key management server while diversifying the keys for transcoded content. This implements a variation of session-based encryption that allows different sessions for different domains to use different keys but does not burden the head end with the process of encrypting content individually for each domain. A similar model can be used by the STB gateway which can derive a unique CEK-D1 from the DomK and the asset ID (PAID2) using the same one-way function. When the client device requests the CEK-D1 from the head end, it will use the PAID2 as the key identifier. The head end will determine to which domain the device belongs, fetch the corresponding DomK from the database and derive the CEK-D1 using the PAID2.

The methods described above for stored (e.g., VOD) content are adaptable for live/linear content to securely transcode and re-encrypt live content. For example, a channel identifier (ChID) may be used in place of the PAID2 for the transcoded content. When the STB gateway requests a transcoding key CEK2, it constructs the PAID, for example, from the ChID and the content transcoding start date (e.g., "Channel 234, Mar. 3, 2013"). The head end creates a CEK2 based on the channel ID and the specified date. In one embodiment, the same key will be used for all content transcodings by any STB gateway on that channel for that day. Accordingly, all content transcoded from the same channel that day will be re-encrypted with the same CEK2. Alternatively, a more granular key diversification can be provided by constructing the PAID from the ChID and the time the content transcoding started (e.g., "Channel 234, Mar. 3, 2013, 18:00"). The head end creates a CEK2 based on the channel ID and the day/hour of the request. This way, the head end needs to store only 24 CEKs per channel per day regardless of how many STB gateways are in the subscriber population. Note that the STB gateway can do this with recorded content as well as live content without necessarily recording it.

In some embodiments, the system can operate with multiple DRM systems which can allow devices that do not all support one common DRM system to be used. The system may, in one embodiment, use keys that are different for different DRMs. The STB gateway may specify what the destination transcoding format and DRM will be. Thus, the STB gateway may re-encrypt the content in such a way that it could be consumed by other DRM systems (e.g., Marlin or PlayReady). Similarly, the client when requesting CEK for a specific PAID may indicate the DRM it supports. In one embodiment, the indication of the DRM may be explicit. In an alternative embodiment, the indication of the DRM may be done implicitly by the head end since it knows what format of a key request or license request was used by the client.

In other embodiments, the system can also provide content copy control. Some or all content is associated with copy protection or copy control directives (CCI). For that content, the system can carry the CCI to the transcoded content. The STB gateway, in one embodiment, copies the CCI from the incoming content and uses it in the transcoding content as well. This may be done, for example, by attaching a copy control descriptor to the Program Map Table (PMT) in the MPEG-2 transport stream (TS). MPEG Dynamic Adaptive Streaming over HTTP (MPEG-DASH), which enables high quality streaming of media content over the Internet delivered from conventional HTTP web servers, has an equivalent metadata "box" in the ISO/MP4 file format.

Alternatively, the head end may control the CCI for the transcoded content by providing information to the STB gateway or directly to the destination device, for example, when it returns the CEK2 for the request PAID2. In this method, the head end can change the CCI value. Changing the CCI can be used, for example, where the original content was marked as 'copy-one-generation' but the transcoded content should be marked as 'copy-never' as it is intended for streaming only. In an alternative example, where the user purchased an off-line consumption option for the destination device, the CCI delivered by the head end may say 'copy-one-generation' to allow the destination device to store the content for later playback.

In further embodiments, the system may use Entitlement Control Messages (ECMs) to deliver re-encryption keys. In general, an ECM is an encrypted message that is used to prevent unauthorized reception for such services as cable or satellite television. In one embodiment, the CEK2 may be delivered in the ECM associated with the original content PAID1. For example, the ECM can deliver the CEK1 for decryption of the content delivered to the home over cable or satellite. The same ECM may also contain CEK2 labeled with PAID2 to be used by the STB gateway to transcode the content for the streaming to other devices in the home. Both of the CEKs can be protected, for example, using common CAS system methods (e.g., encrypted by a key delivered in an EMM message). This method is very useful for STB gateways that do not have broadband IP connectivity back to the head end. This way the head end may create the CEK2 for the PAID2 ahead of time and distribute it with the original content. Only STB gateways that are capable of transcoding will use it; other STB gateways will ignore it. Using a second key for future transmission can allow the content protected with CEK1 to remain protected if CEK2 should be compromised.

Alternatively, the STB gateway can derive the CEK2 from CEK1 using a known one-way function rather than the CEK2 being delivered explicitly in the ECM. If the same function is known by the head end, it may derive the same key when a client device requests CEK2 for content PAID2. The client may indicate the original PAID1 or the head end may be able to find the original PAID1 via the LAID and the conventions for constructing the PAID from the LAID (e.g., as described above). Additionally, the key derivation may depend on more than the PAID, for example, also on the client or domain ID.

In still other embodiments, the system may include the use of hardware (HW) key ladders, which are group member's keys that are structured in a set of 1:N relationships. The use of HW key ladders in devices, such as STB gateways, can limit exposure of the clear CEK keys to HW modules without exposing them to software. The HW key ladder may be in a system-on-a-chip (SoC) in the STB gateway, and can be used in the system in various ways. In one embodiment, the DomK is delivered over-encrypted by a unique chip key (ChipK) which is typically installed at the root of the key ladder (e.g., the ChipK corresponds to K3 of K-LAD (K-LAD is an ETSI standard)). The CEK2 may, for example, be delivered to the STB gateway encrypted by the DomK. Alternatively, the PAID2 may be used as the input to the key ladder at the next level to generate K-LAD K1 or K-LAD CW. This configuration is beneficial, for example, in an embodiment that binds content to domains, as only the DomK is delivered by the head end and the PAID2 is shared by the devices in the home via a standard protocol (e.g., universal plug and play (UPnP)/DLNA) and the key derived from DomK and PAID2. In a further embodiment, the system may include support for other key ladders in which it uses a key ladder implemented in TrustZone to make a key hierarchy compatible with the STB gateway's key ladder.

In still other embodiments, the system may include other security measures, for example, watermarking. For example, the head end may supply the STB gateway with information to be embedded in following content generations. The STB gateway can use the supplied information to apply a watermark to transcoded content. The watermark may be unique to the STB gateway or to the client device or to the domain. If the watermark information is not delivered by the head end, the gateway may use its unique identified and some other attributes (such as time of day) to create a unique watermark payload. The original content may already contain a watermark. The STB gateway generally adds the new watermark to the already marked content. Alternatively, the existing watermark may be removed. However, this could risk exposure of security sensitive information and the ability to remove the mark to be replaced. The watermark information may be based, for example, on domains, devices, content, or other criteria.

FIGS. 3 through 14 illustrate various detailed embodiments which are described below.

Figure 3:
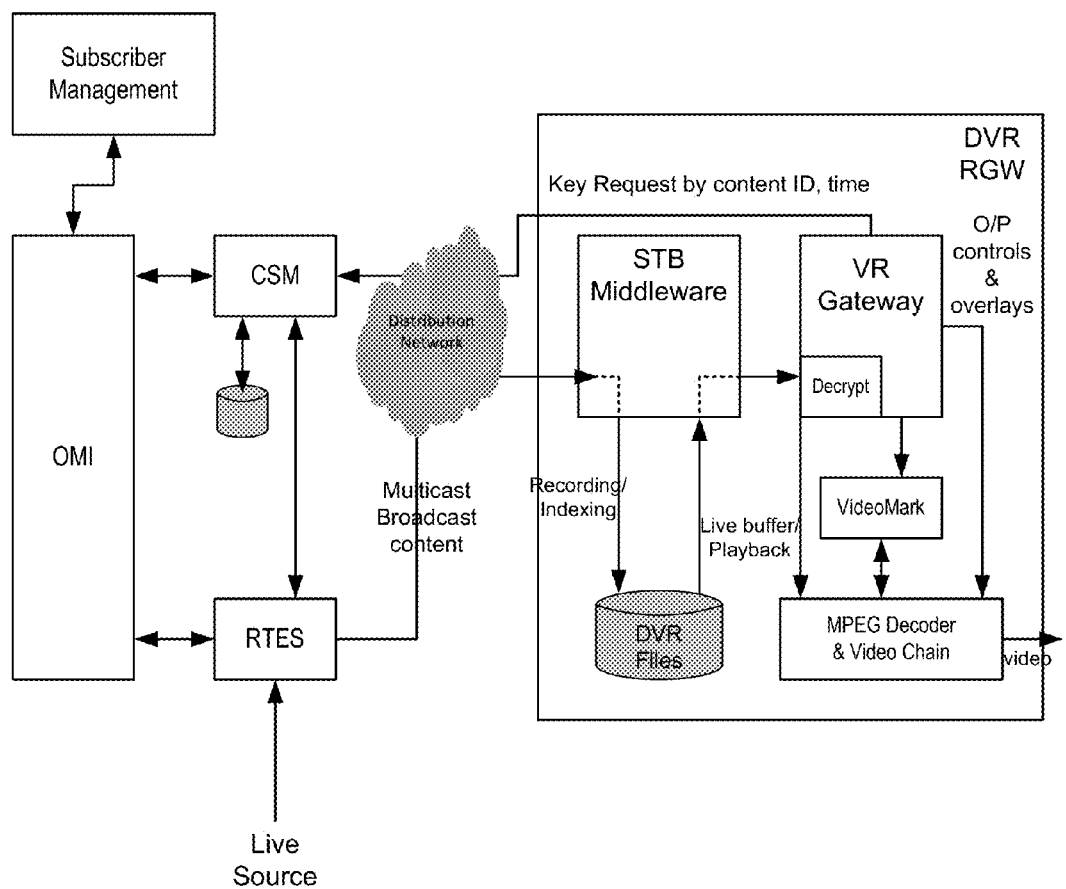
FIG. 3 is a functional block diagram illustrating how VCAS for IPTV may use a real-time encryption server (RTES) component to encrypt real-time multicast video traffic and route it for recording on a DVR capable STB and subsequent playback.

FIG. 3 is a functional block diagram illustrating how VCAS for IPTV may use a real-time encryption server (RTES) component to encrypt real-time multicast video traffic and route it for recording on a DVR capable STB.

In the primary model of smart card supported STB/DVR operation, the DVB audio and video data streams are encrypted as usual in the head end, and are transmitted to the STB/DVR functions together with entitlement management messages (EMMs) and entitlement control messages (ECMs), containing encrypted keys and access information, to enable operator controlled decryption of the content in the STB/DVR. The ECM contains access criteria and a scrambled key referred to as a control word, which is sent encrypted to the STB. If the customer is authorized to acquire the reception, a subsystem in the STB decrypts the message. The STB knows whether or not the customer is authorized because the authority is sent to the STB in the EMM. Based on the locally stored entitlement levels, the content can either be consumed directly in real time or be stored on the DVR exactly as transmitted. In IPTV systems, DVR content is recorded as is without re-encryption. The one-way DVB system re-encrypts the DVR content for local storage. This approach uses the inherent security of the control word encryption mechanisms used for broadcast distribution to also protect the recorded content streams.

The DVR support for RF broadcast (one-way) systems can take advantage of several different mechanisms depending on required features and the hardware support available. For one-way systems, the decryption key management and entitlement mechanisms are a function of locally stored information in the STB or residential gateway (RGW), conventionally supported by a removable smart card. When implemented on advanced STB chipsets with appropriate security functionality, cardless solutions are also possible.

Figure 4:
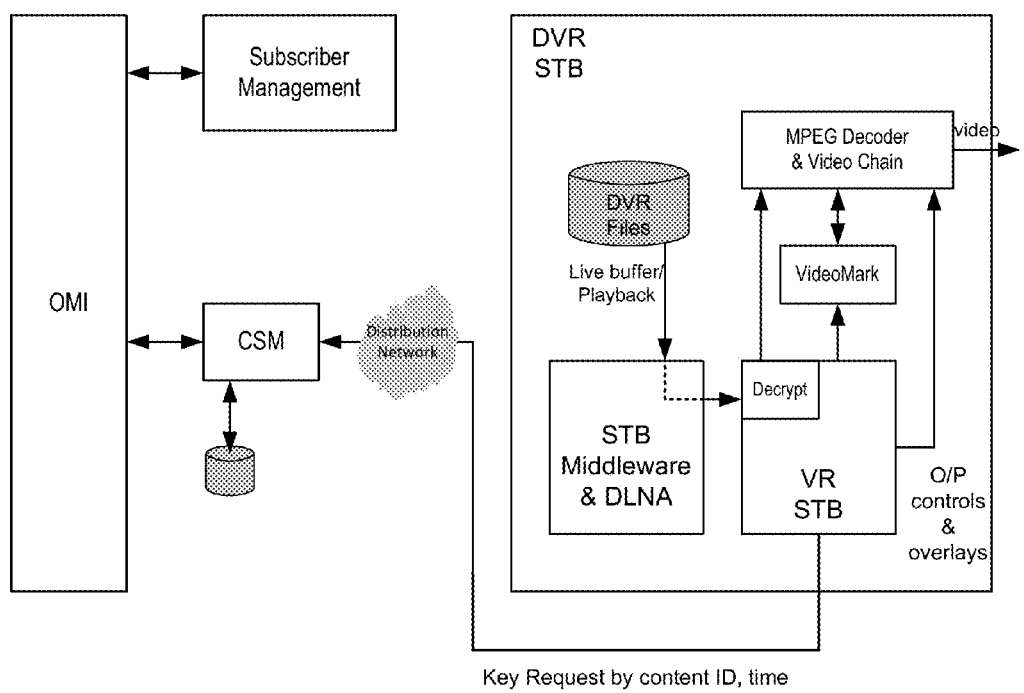
FIG. 4 illustrates an overall process for local DVR playback in accordance with one embodiment of the present invention.

FIG. 4 illustrates an overall process for local DVR playback in accordance with one embodiment of the present invention. The classical use of the DVR function by an STB/RGW device to capture linear content demonstrates how the DVR recording strategy above interacts with the larger system environment and preserves operators fine grain business rule control over content stored in the home. If all service components of a VCAS encrypted stream have been preserved in the recorded file, then the playback process will be treated as a time shifted process identical to that for key retrieval used for the broadcast stream if it were being consumed live. Note that the keys to decrypt a recording are only available via authenticated requests to the head end. That is, they are not cached locally along with the recorded content itself, which would represent a potential security risk and limit the granularity of any business rule control that could be maintained over long period. Once a recorded stream is selected for playback, and the MPEG Program Specific Information (PSI) structure of the stream is parsed, the ECM packets are extracted and using channel and time identifiers contained in these packets, the correct key to play the stream is identified. The VR client code verifies from the channel ID and timestamp that it does not currently have the required key cached (a key may exist if the content was only recently recorded or previously requested). It then constructs an explicit key request for retrieval from the VCAS head end.

Figure 5:
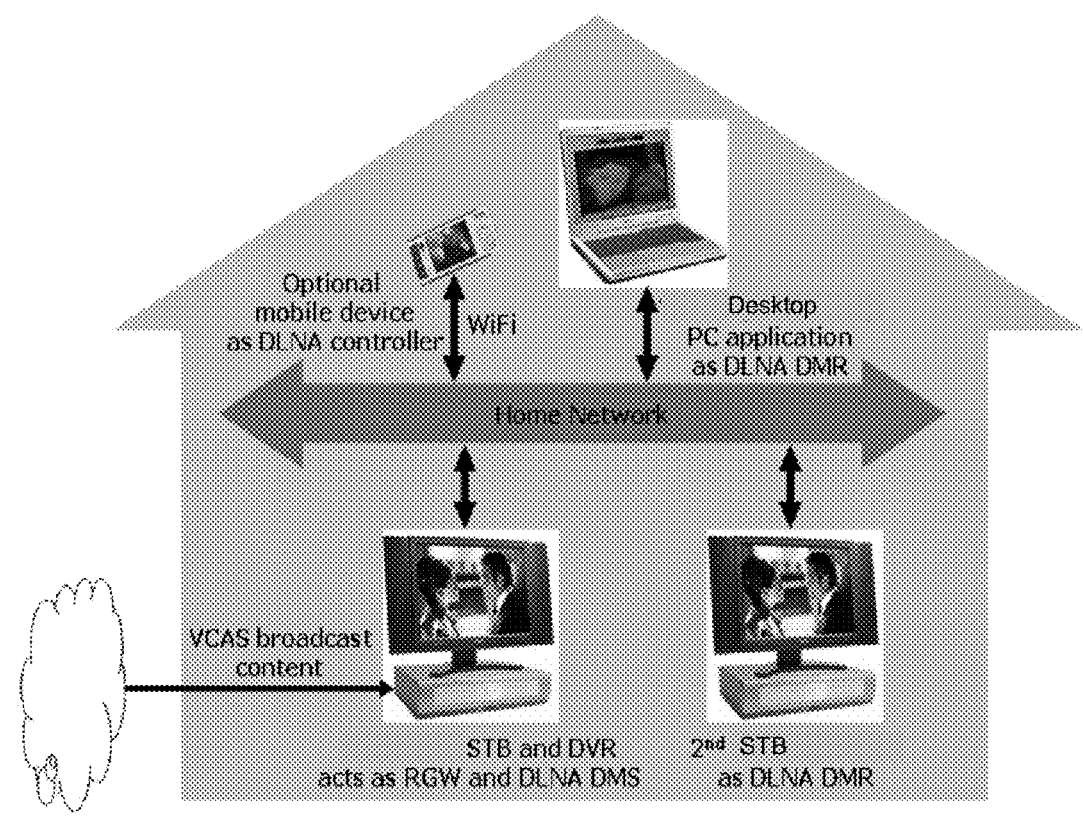
FIG. 5 illustrates how a VR Gateway can enable different client devices to share content through the home network.

The above-disclosed content protection systems and methods can also be used in and with the VR Gateway client, which can support different devices in the home network. FIG. 5 illustrates how a VR Gateway can enable different client devices to share content through the home network.

The digital living network alliance (DLNA) device communication architecture enables device and content discovery within the home network and subsequent streaming, or possibly copying of the content, between devices in the home, which utilizes home networking technologies (e.g., Ethernet, MoCA, Wi-Fi, etc.) and standard protocols (e.g., UPnP, HTTP, and MPEG-2 TS). DLNA enables an extended whole home DVR capability by treating a single DVR or RGW as a digital media server (DMS), which receives the service provider's content and redistributes it within the consumer premises to client devices known as digital media players (DMP) or digital media renderers (DMR). For the purposes of DLNA support around the home, VCAS has been issued a Multipurpose Internet Mail Extension (MIME) type by Internet Assigned Numbers Authority (IANA) such that content directory service (CDS) may signal VCAS content protection in the description element.

The playback process on any VR-enabled device in the home domain is identical to that for local DVR playback as described above, with the exception that the content must be discovered and fetched across the local home network. In particular, the additional content protection layers and mechanisms scale in a very effective manner from recording device to playback device in this architecture.

Figure 6:
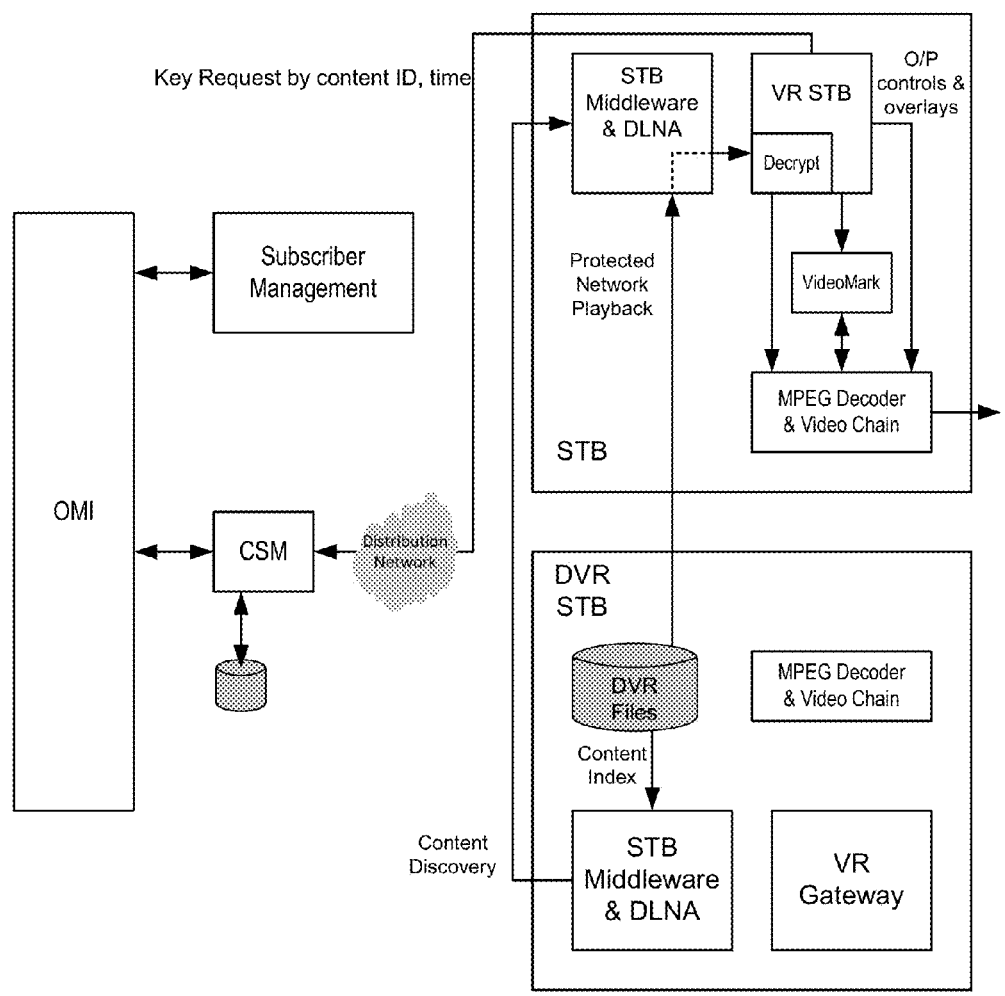
FIG. 6 illustrates an architecture where VCAS is used for end-to-end content protection.

FIG. 6 illustrates an architecture where VCAS is used for end-to-end content protection. This whole-home DVR scenario allows a user to see and play DVR content on any STB/TV in any room in the house. Keeping content persistently protected by VCAS from a central STB or RGW device to another low-cost-connected display device is an economical and efficient way to transfer and view content, especially as it eliminates the risk and cost of the re-encryption step on the DVR/RGW device. In one embodiment, the display device requests the key (to decrypt the content) from the head end VCAS by referencing the asset ID or domain ID signaled in the DLNA content discovery.

For protected content, DLNA provides a mechanism to signal content protection in the CDS via a standardized MIME type. By default, DLNA supports Digital Transmission Content Protection for Internet Protocol (DTCP-IP) link protection that is independent of the conditional access/digital rights management (CA/DRM) used to deliver the content to the home. When DTCP-IP is used, the RGW/DMS terminates the service provider's CA/DRM, decrypts the content and re-encrypts it for further distribution within the home over DTCP-IP.

Figure 7:
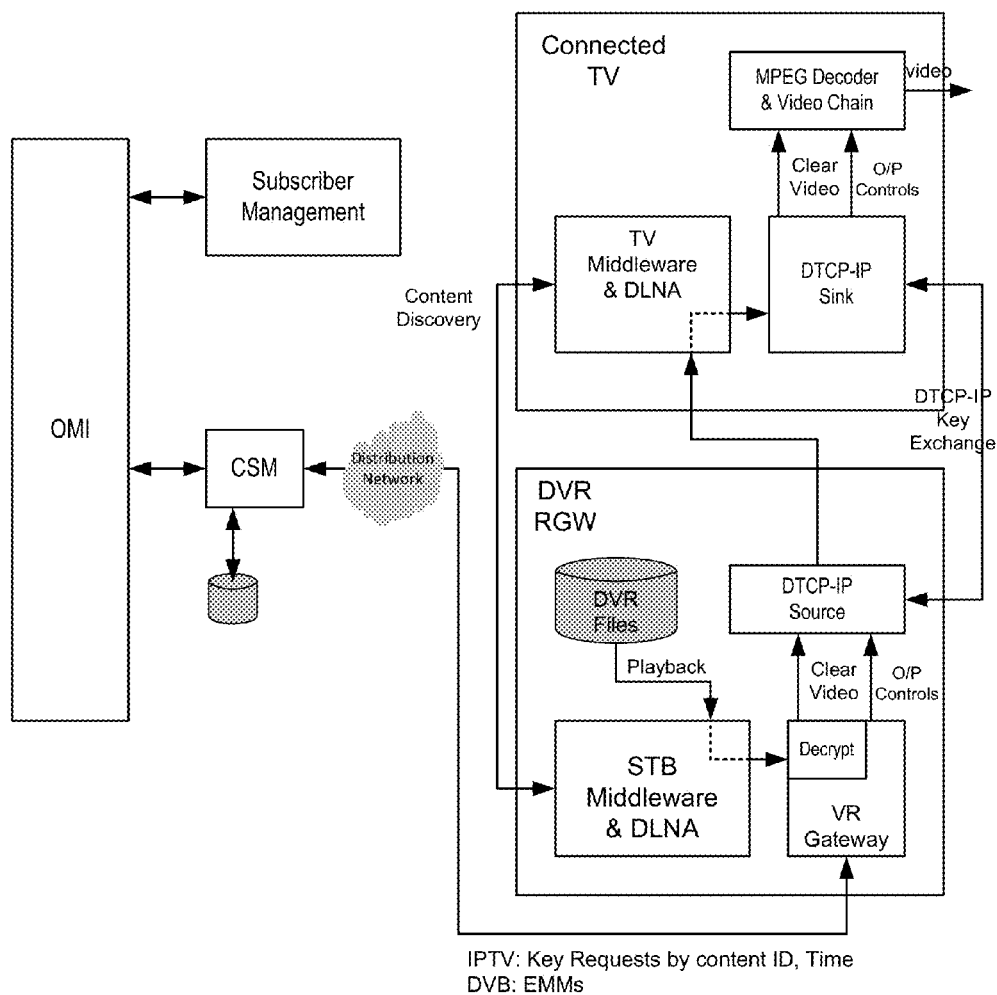
FIG. 7 illustrates one approach for converting VCAS protected content as recorded on an RGW device into a DTCP-IP protected delivery to another home device.

FIG. 7 illustrates one approach for converting VCAS protected content as recorded on an RGW device into a DTCP-IP protected delivery to another home device. This approach is suitable for client devices that are not equipped with the VR client.

Figure 8:
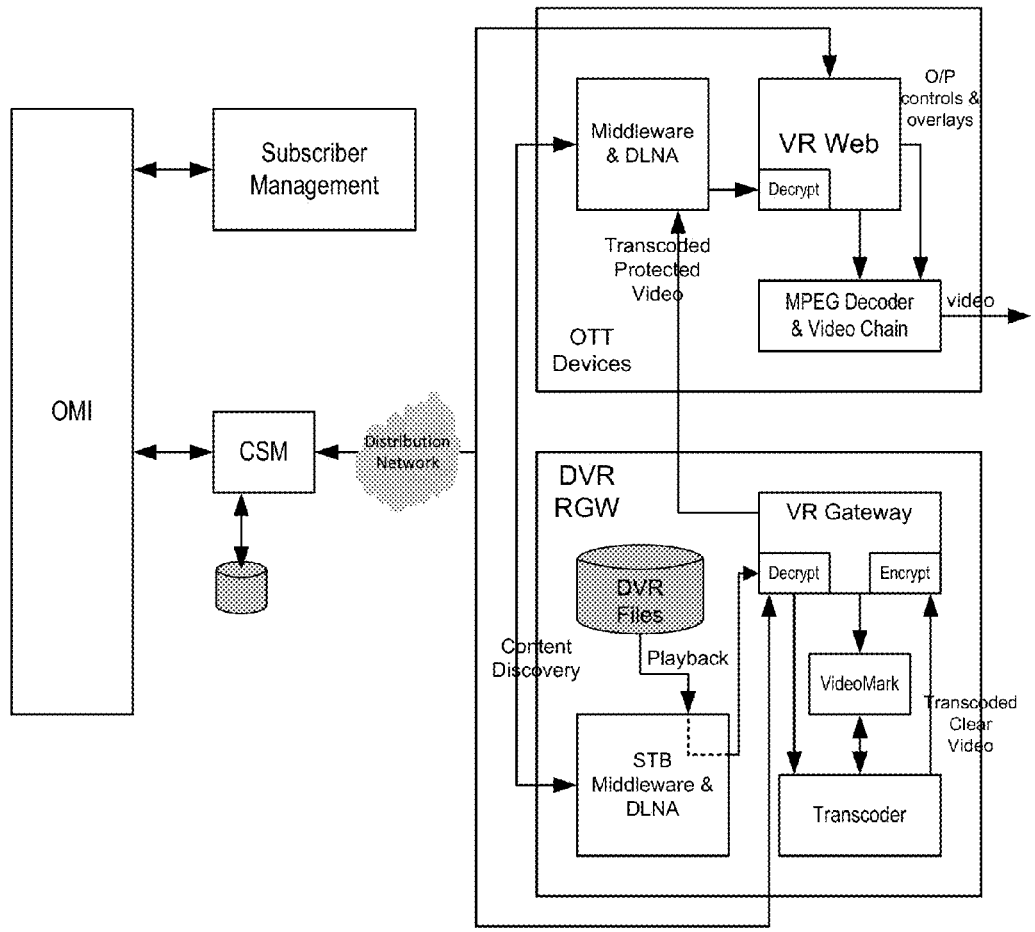
FIG. 8 shows one approach for transcoding of the VCAS protected content on an RGW device for delivery to another home device.

In a typical home network, there may be devices that are incompatible with the video format of the content recorded on the RGW. Moreover, some of these devices such as smart phones are not suitable for playing content at HD resolutions and bitrates. In this case, transcoding of the content in the RGW is the solution for streaming and sharing the recorded content to these devices. Thus, a VR Gateway client will enable the RGW to decrypt the VCAS-protected content, transcode it to HTTP live streaming (HLS) or MPEG-DASH and re-encrypt it with a different set of keys. RGW will request re-encryption keys from VCAS. The transcoded and re-encrypted content will be shared with the client device (e.g. mobile device or tablet). DLNA assists in discovering DVR content and signals capabilities of the client device to the RGW. The client device requests decryption keys from VCAS, and VCAS verifies device's domain membership and content entitlement before delivering keys to the device. This mechanism allows the operator to control which device and what content may be shared in the home. FIG. 8 shows one approach for transcoding of the VCAS protected content on an RGW device for delivery to another home device.

Figure 9:
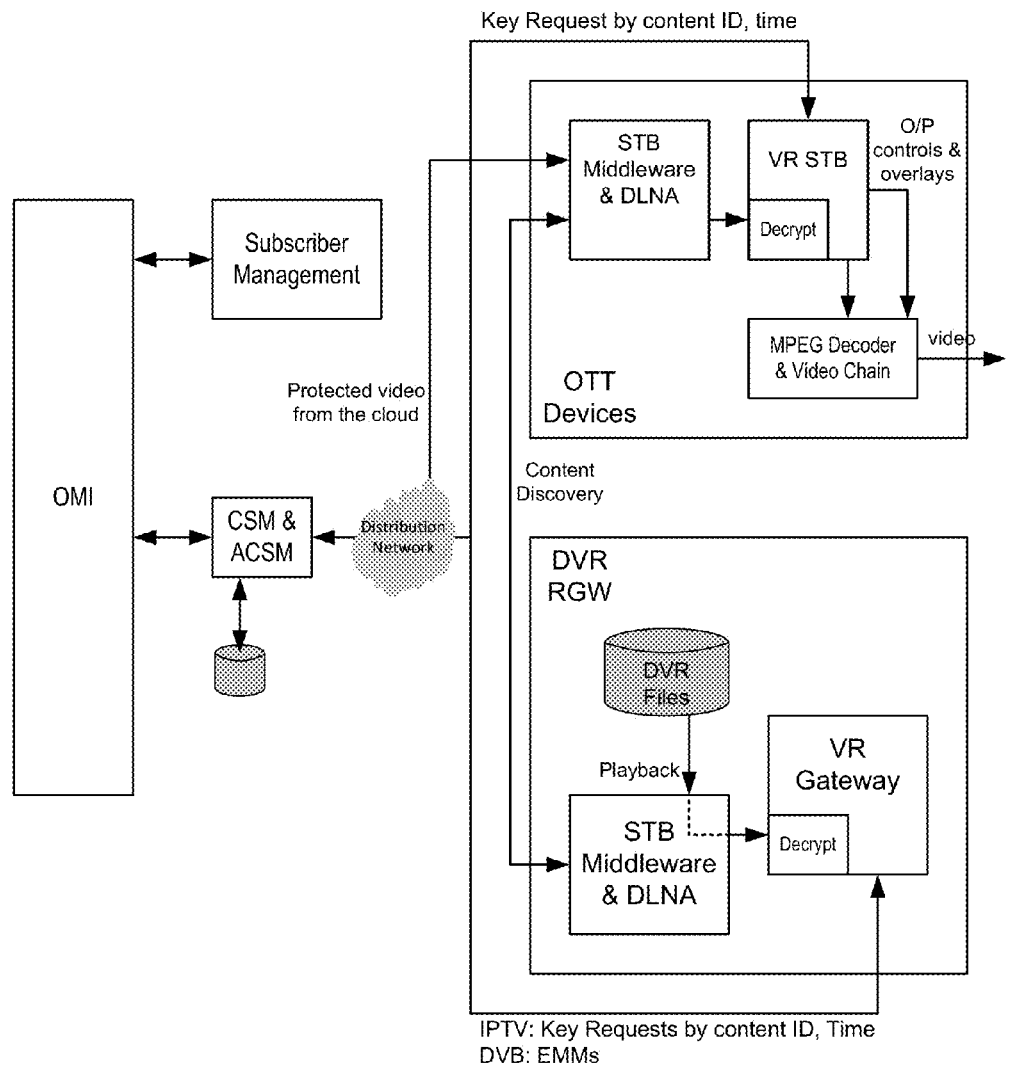
FIG. 9 shows one approach for VR content sharing with cloud assistance with no transcoding in the gateway.

FIG. 9 shows one approach for VR content sharing with cloud assistance. Some DVRs may not have the ability to transcode content or it might be considered more cost efficient to use CPU resources in the cloud to generate the appropriate formats. While the DVR or RGW records content, it may communicate the content information to the VCAS head end or make it available on request from the head end. The home Gateway can communicate the capabilities of the second device to the VCAS head end and the content access rights could be communicated by the head end to the Gateway. The head end needs to have some or all contents available in the appropriate format for the second device (using e.g. an adaptive bitrate protocol such as HLS or MPEG-DASH) in the form of a network DVR. Therefore, the remote device can directly receive the VCAS protected content from the head end with cloud assistance. The device will discover the locally recorded content on the DVR via DLNA, recognize the incompatibility of the device format and subsequently request it via OTT from the head end. VCAS will authenticate the device, check its domain membership and verify its entitlements and then the keys are delivered securely and directly to the device.

An extension of this model is when the second device leaves the home network. In this case, DLNA is not used since DLNA only works within a home network. Instead, the remote device discovers content on a Network DVR. It requests content over an external network. VCAS verifies the device's domain membership and content entitlement before streaming. Content is streamed over HLS or other adaptive bitrate protocol. In this model, the streaming could start in the home over a managed network or transcoded from local DVR and then continue outside of the home via OTT. Therefore, the user who has been watching on his mobile device can continue watching the same content outside of the home network by directly receiving the content from the VCAS head end.

In one embodiment, the VR content is shared with OTT simulcast, where the OTT content is delivered to the RGW by the VCAS head end in addition to the IPTV or DVB content. The OTT content can be stored encrypted on the RGW directly. Then, RGW may share this content with other devices in the home network. This use case does not require transcoding of the content to the format needed by the secondary devices. Instead, the right format is transferred from the head end encrypted by VCAS to the RGW and then shared with other devices on the home network. The advantage of this approach compared to the earlier described cloud-based solution is that content is transferred to the secondary devices on the local network rather than unmanaged network from the head end. Therefore, it will benefit from the faster speed of the local network and potentially higher bitrate, higher quality experience.

In another embodiment, the VR content is shared for non-VCAS protected contents. This use case is similar to the VR content sharing with DTCP-IP use case of FIG. 7 in which the content is transcoded to be compatible to the target device, but the original managed content coming to the gateway is protected by a non-VCAS CA system. In this case, the solution can be similar and VCAS will generate new keys in real time to protect the content inside the home network.

Figure 10:
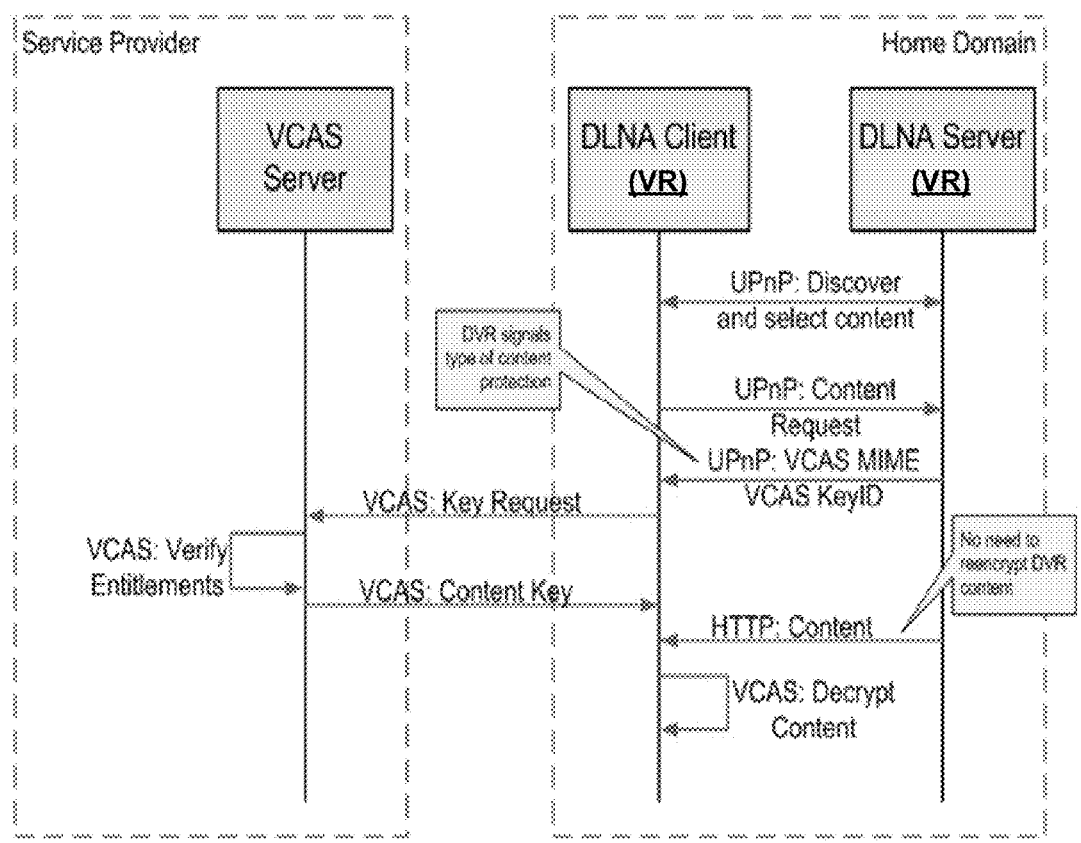
FIG. 10 is a process flow diagram of VCAS integration with DLNA in accordance with one embodiment of the present invention.

FIG. 10 is a process flow diagram of VCAS integration with DLNA in accordance with one embodiment of the present invention. VR Gateway supports Whole-Home DVR using standard protocols such as DLNA/UPnP by allowing signaling of other protection mechanisms via a MIME type. In this solution, the VR Gateway is integrated with DLNA functionality which enables an extended whole home DVR capability by treating a single STB/DVR or RGW as the media server that receives the service provider's content and redistributes it within the consumer premises to client devices. The main benefit of this solution is to record and share broadcast content without the burden of content re-encryption for every stream on the DVR or RGW side.

Figure 11:
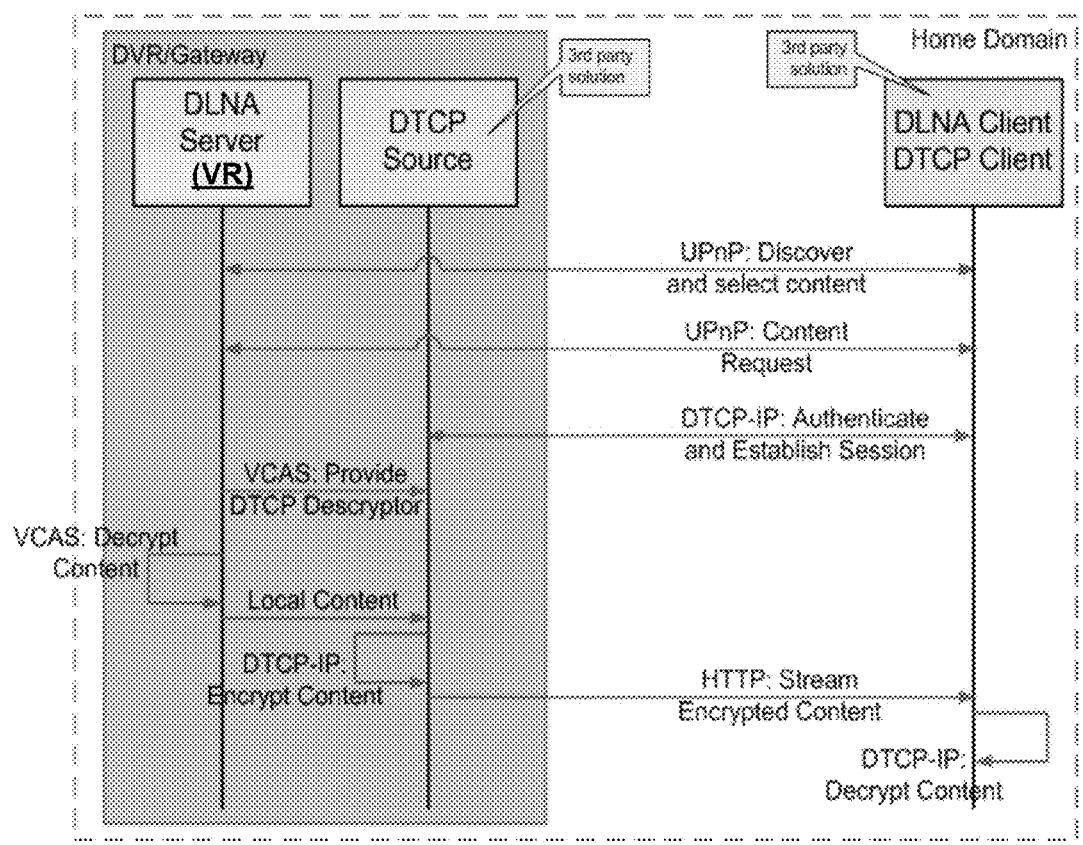
FIG. 11 is a process flow diagram of a simple integration of VR Gateway with DTCP-IP in accordance with one embodiment of the present invention including providing copy control information to DTCP-IP.

FIG. 11 is a process flow diagram of a simple integration of VR Gateway with DTCP-IP in accordance with one embodiment of the present invention. A goal of VR Gateway is to support the widest range of devices. On the home network, some devices may have a VR client and others may have DTCP-IP support, which is the DLNA default link protection. Therefore, VCAS protected content may be exported to DTCP-IP on the DVR/RGW when streaming to a DLNA/DTCP-IP enabled client device. In this case, VCAS to DTCP-IP re-encryption for every stream is required.

Figure 12:
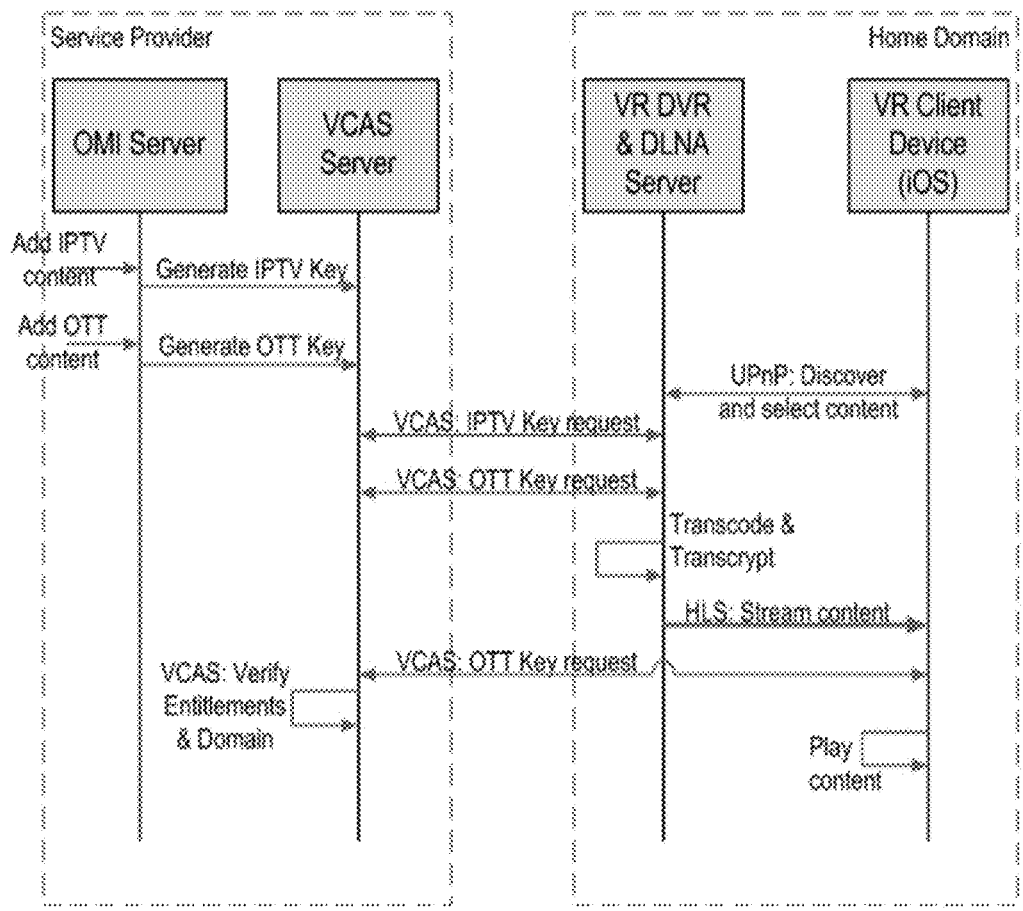
FIG. 12 is a process flow diagram of transcoding of local DVR content using VR Gateway in accordance with one embodiment of the present invention.

FIG. 12 is a process flow diagram of transcoding of local DVR content using VR Gateway in accordance with one embodiment of the present invention. The VR Gateway can enable access to the DVR content even for an incompatible device, which cannot consume the recorded content without transcoding. RGW requests re-encryption keys from VCAS and transcodes and re-encrypts locally stored content. There are several benefits of using VR Gateway in this case.

For example, one benefit includes the fact that recordings may be uniquely re-encrypted per device or per home domain. Therefore, a security breach of content on one home network does not automatically mean a potential breach of all home networks. The VOD content (IPTV and OTT) is encrypted explicitly with unique content encryption keys. Live content may be transcoded and re-encrypted using OTT keys (e.g., for HLS) that are associated with IPTV channel keys. In another example benefit, keys for locally recorded content do not have to be persistently stored on the recording device. Therefore, a new key management protocol for the home (e.g., DTCP-IP) is not required. In yet another example benefit, other devices on the home network may request keys from VCAS in order to play locally recorded and re-streamed content. In yet another example benefit, content access rules are still managed by VCAS. For example, content recorded on a DVR can expire after a pre-defined period (such as two months), enforced by VCAS which then stops distributing keys for that content. VCAS can also validate that the user is still subscribed to the channel/service the recording was made from and prevent transcoding or sharing in the home if the subscription is no longer current. In yet another example benefit, a compromise of a key for a locally recorded content must not compromise the original channel key that delivered the content to the DVR/GW. In yet another example benefit, copy control and output protection is enforced throughout the home network. Therefore, it prevents redistribution of the content outside of the home network.

Figure 13:
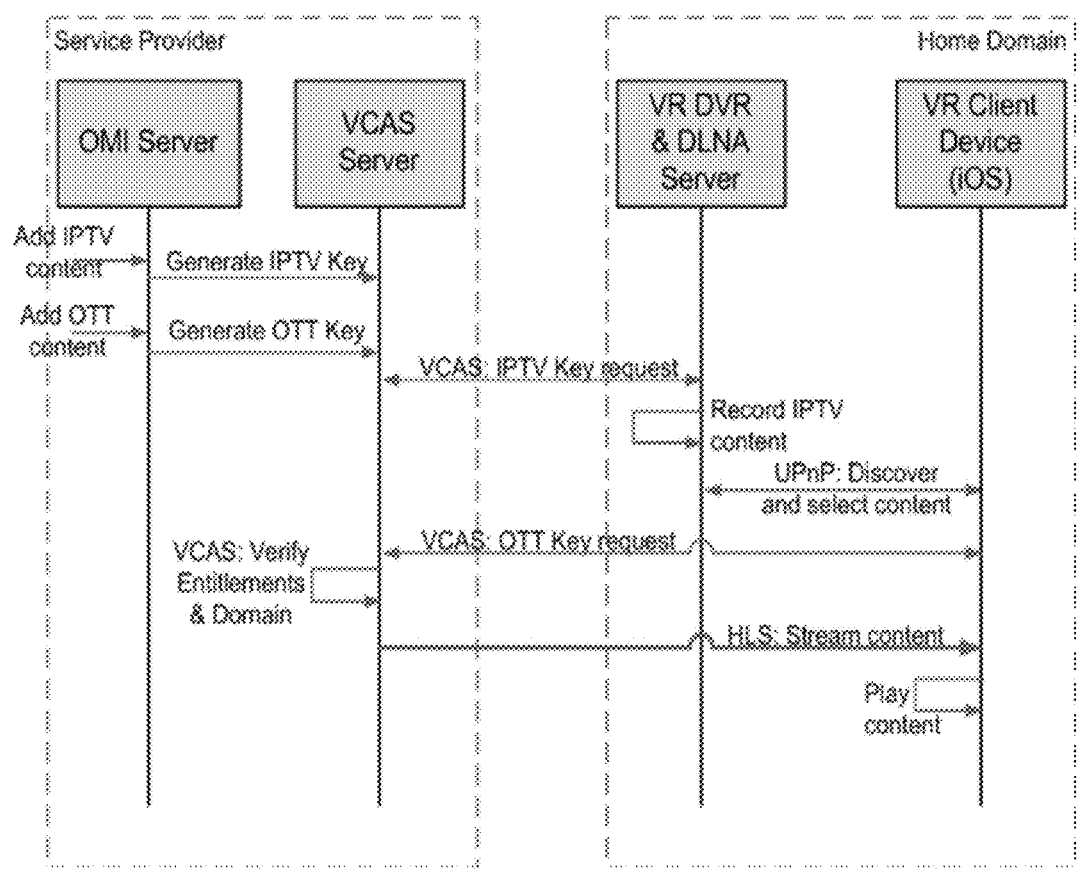
FIG. 13 is a process flow diagram of cloud-based streaming of the content without local transcoding in accordance with one embodiment of the present invention.

FIG. 13 is a process flow diagram of cloud-based streaming of the content without local transcoding in accordance with one embodiment of the present invention. VR Gateway can enable access to the DVR content by an incompatible device without local transcoding. While DLNA is used to discover DVR content, the content format is not supported by the remote device and therefore signals an alternative content source with Content ID. Then, the remote device could login to the head end, determine what recordings are available in the home and request the streaming of the selected movie directly from the head end. VCAS can verify the device domain membership and content entitlement before streaming. This mechanism ensures that only content recorded by the user in the home is available remotely.

Figure 14:
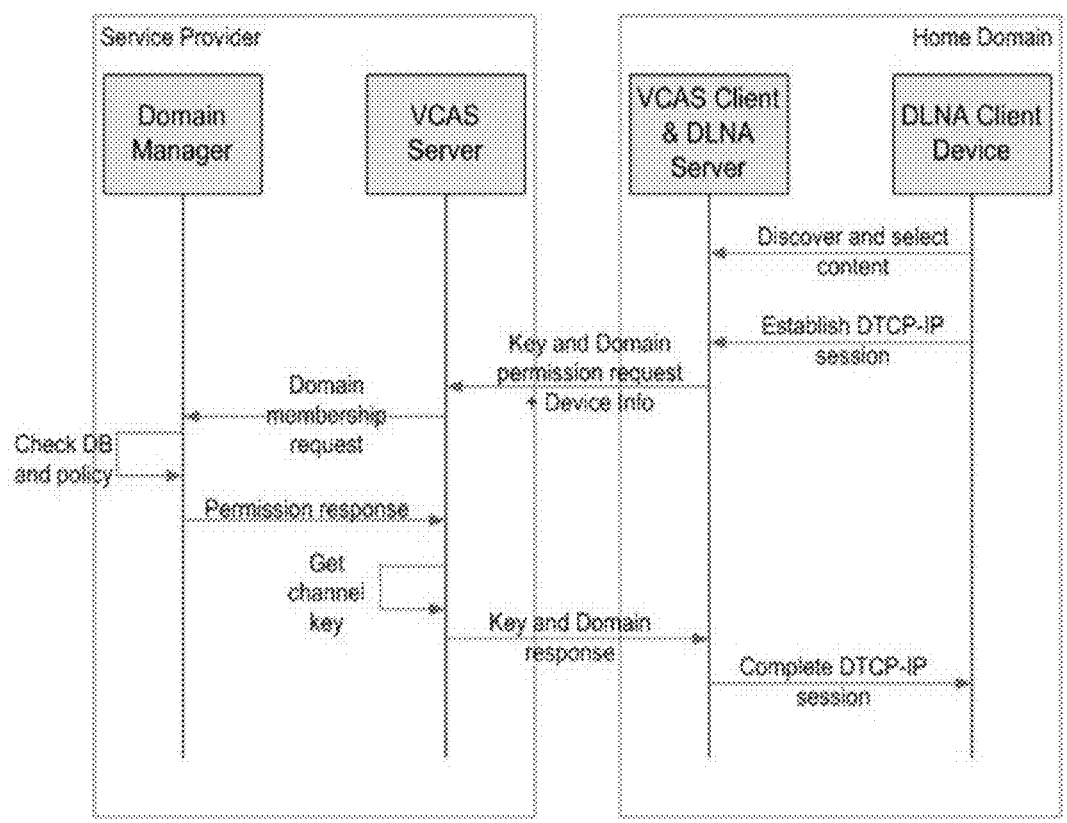
FIG. 14 is a process flow diagram of VCAS domain management incorporating DTCP-IP enabled devices in accordance with one embodiment of the present invention.

FIG. 14 is a process flow diagram of VCAS domain management in accordance with one embodiment of the present invention. Typically, a service provider (e.g. an IPTV or DVB operator) has full control of how many devices (e.g. STBs) there are in each home and charges the end user accordingly. However, when DLNA is used stand alone, the operator can deliver content to the DVR/RGW with no control over which and to how many other devices the content can be distributed within the home. DLNA uses DTCP-IP as default link protection. DTCP-IP does not support a concept of domain because any DTCP-IP enabled device can talk to any other device regardless of domain membership. Moreover, the operator also does not know whether some devices are "traveling" between locations, potentially side-loading content that was not intended to be shared outside of the home.

VR Gateway provides consistent domain control over all devices in the home network. It support VCAS and DTCP-IP enabled devices in a transparent manner. As a user starts playback of protected content that is stored on an RGW device, the VR client typically sends a key request message to the VCAS server in the head end, which in turn verifies the entitlement of the user/device for the requested channel/service. If positive, VCAS returns the protected channel key (or an equivalent). If the DVR playback is triggered by a request from a DTCP-IP connected device, the DTCP certificate (or the associated device ID) may be included with the key request to the VCAS server. The VCAS server can then maintain a list of active DTCP-IP client devices associated with this VR RGW client and the associated domain size policy. If the device is either on the list, or not on the list but the domain size limit has not yet been reached the request is granted. The DTCP-IP device is added to the list and the "last used" time stamp is updated. Alternatively, if the VCAS device (e.g. RGW) already possesses the content key, but it has not communicated with the DLNA client device before, it may just request the domain membership for this new client device.

The service provider may maintain the domain size policy in the server by keeping a list of devices, the frequency of their use, the last time used, etc. Devices may be removed explicitly, or they may age out of the domain when not used for an extended period of time, or a new device may replace the device that has not been used the longest, etc. The key response may also include a list of device IDs that are associated with this user's domain. This is an optimization allowing the VR client device to cache the channel key and not request it again when a different device tunes to the same channel. The VR client may keep a list of devices that are authorized to participate in the content exchange.

Another advantage of managing the home domain in the infrastructure is the ability to add a device to a user's home domain even if the device does not use DLNA and/or DTCP-IP. For instance, if a user owns a television supporting Marlin DRM, or a PC that uses PlayReady DRM, and receives content directly from the same service provider (e.g. as an OTT service), these devices may be included in the user's domain as managed by the head end without these devices ever communicating with the rest of the home network.

In summary, systems and methods for protecting digital content within a domain are provided herein. The systems and methods can enable a set-top box (STB) gateway (e.g., digital video recorder (DVR), residential gateway (RGW), or similar device) to decrypt protected content, transcode it to another format (e.g., HTTP live streaming (HLS) or moving picture experts group-dynamic adaptive streaming over HTTP (MPEG-DASH)). The STB gateway may request re-encryption keys from the head end (e.g., a video content authority system (VCAS)). The transcoded and re-encrypted content can then be shared with client devices (e.g., mobile devices or tablets). A digital living network alliance (DLNA) can be used to assist in discovering DVR content and can signal capabilities of the client device to the STB gateway. The client device may request decryption keys from the head end, and the head end can verify the device's domain membership and content entitlement before delivering keys to the device. The system operator can thereby control which devices and what content may be shared. Additionally, domain management (e.g., size of a domain, device type and specific device list) and rights management (e.g., what content can be shared, how long the content can stay on the DVR and under what conditions) may be performed by the head end rather than the home network or individual devices.

In one aspect, the invention provides a method that includes delivering content to a first client device, decrypting the content at the first client device using a first key, transcoding the decrypted content, re-encrypting the transcoded content using a second key, delivering the re-encrypted content to a second client device, the second client device connecting to a head end to retrieve the second key, and decrypting the re-encrypted content at the second client device.

In one embodiment, the first client device is an STB gateway. In one embodiment, the second key is bound to devices within a domain. In another embodiment, the second key is derived by the first client device and the head end. In another embodiment, the second key is derived at least in part using a domain ID associated with the domain and the first key. In yet another embodiment, the second key is derived at least in part using a time value and the first key.

In one embodiment, re-encrypting the transcoded content uses a different digital rights management (DRM) than the DRM used for decrypting the content using the first key. In one embodiment, the method further includes the first client device modifying copy control parameters associated with the content. In one embodiment, the second client device connects to the head end to retrieve the second key via the first client device. In one embodiment, the second key is delivered with the content delivered to the first client device. In one embodiment, the second key is delivered out of band. In another embodiment, the second key is delivered in an entitlement control message (ECM).

In one embodiment, the method further includes the first client device embedding a unique watermark in the transcoded content. In a further embodiment, the watermark includes information received from the head end.

In one embodiment, the keys are derived on the first client device using a hardware implemented mechanism including a unique key. In an embodiment, the keys are derived on the second client device using a hardware-implemented mechanism including a unique key. In a further embodiment, the hardware-implemented mechanism is a key ladder.

The systems and methods disclosed above may be used in various additional applications and may include various additional features. Examples of some of the additional applications and features are described below. The protection system can be used with the VCAS and the examples are described for use with VCAS. In various embodiments, the VCAS provides tools and support for operators required to address the opportunities from the convergence of video delivered over various types of networks (whether managed or un-managed) to a multitude of devices.

VCAS features and applications include: (1) "Walled garden" IPTV and DVB over managed networks such as telco, satellite, cable, terrestrial; (2) Hybrid services, extending linear DVB services with IP-based VOD services and vice versa; (3) Internet TV, OTT and mobile services implementing HTTP adaptive bitrate streaming; (4) Harmonized rights management across multiple networks, DRMs and devices; (5) Wholesale-retail content distribution: a centralized, hosted service with local control options; and (6) Legacy CAS replacement with cardless security for all types of networks and devices.

In the context of content protection in secure home domain, DVR functions should be supportable without compromising the security perimeter of the pay-TV system. Approaches to maintaining an adequate level of security when content is in a recorded form at the consumer premises include using STB unique key or storing encrypted content as it is received.

In one embodiment, recorded content is stored using an STB unique key to create encrypted files on the DVR/RGW. The process of localizing content involves decryption of incoming streams and on-the-fly re-encryption while recording to disk. This involves a set of hardware accelerated functions. The encryption process often seeks to "pair" the disk files and local hardware, creating a local key that prevents copying. However, since the decryption key for content is entirely managed locally, files can typically be replayed at any point after recording without reference to the operator DRM, or possibly even after a service subscription has been discontinued. This local hardware pairing also tends to frustrate the goals of networking DVRs together inside the home, where the fundamental requirement actually includes play out of recorded content on non-local hardware.

In another embodiment, encrypted content is stored as it is received from the broadcast source to local DVR files. This more modern approach preserves the strong encryption used for the broadcast transmission of content through to the stored format with no exposure due to on-the-fly decryption/ re-encryption. It also preserves the content security reference information transmitted with the content, including any control signaling related to permitted outputs. This recording approach preserves the connection of DVR content to the underlying security system of the broadcaster, with the result that business rules for playback and home network distribution remain at the discretion of the operator. The overall content security system is employed to manage key access for any subsequent playback or copying of the content to maintain the application of appropriate business rules.

Consumption of recorded content may include several basic models which are described below. A first example model includes recording and using content on a DVR or gateway. This is a simple case where the security of the system is guaranteed within a single VCAS-enabled hardware device and the display of the recorded content can be presented alongside selections of live channels or on-demand choices seamlessly. A second example model includes streaming content to other STBs in the home. In this case, the content is consumed from the DVR by a device that is also connected to the home network and is enabled by VCAS. The discovery of the available content necessarily involves network protocols (typically DLNA) and the delivery of that content usually emulates a video-on-demand (VOD) session using the RGW as a server, utilizing similar protocols to those used in a network VOD session. A third example model includes consuming content on non-VCAS enabled devices in the home network. This is an alternative model that enables broader consumption on content stored on the DVR by home devices that support a different standard for protected delivery (i.e., DTCP-IP). A fourth example model includes streaming transcoded content to other devices in the home. The content is transcoded to a lower bitrate and re-encrypted on the DVR before being re-streamed locally. Then the transcoded content is shared with the devices in the home network for consumption. Transcoding may be performed in a gateway or in a standalone companion transcoding device. A fifth example model includes receiving the content outside of the home. In this case, the recorded content will be transmitted from the VCAS server to the mobile devices directly using OTT network and the device can reside either inside or outside of the home network.

In yet another embodiment, VCAS enables content protection for DVB, IPTV and Hybrid services including securing linear channels and on-demand assets across a variety of delivery devices configured as unified security for broadcast and file-based content. In this embodiment, VCAS provides a comprehensive approach to consumer media entitlements, copy protection, rights management and domain control. In the VCAS architecture the unified management of secured content is conveniently accomplished by incorporating all necessary file-based content support within the architecture of the core encryption system. By extending the regime of VCAS protection from content distribution through to content storage, any content owner concerns about the potential recorded stream vulnerability to decryption and redistribution are satisfied.

In yet another embodiment, an MPEG-2 transport stream (TS) delivers a content stream in IPTV or DVB networks, carrying audio, video and auxiliary stream data. The content is encrypted to protect it from unauthorized access. The protection provided is especially important for content captured to a DVR, where it could be even more vulnerable to attack than within the distribution channel. The stream information contains identifier and key data necessary to interpret the stream and decrypt the content. This information must be preserved through the distribution channel to enable transport, identification, routing, storage, decoding and playback. The VCAS for IPTV workflow is configured as described below.

In one embodiment, the RTES or MultiCAS component encrypts the stream and generates and inserts ECMs within the MPEG-2 TS and broadcasts on a specific multicast IP address. Intelligent encryption is applied to leave indexing information within the stream available to client components. In another embodiment, the STB or RGW is tuned to channel and executes Internet Group Management Protocol (IGMP) join to the stream multicast IP to receive the broadcast channel packet stream. The IGMP is a communications protocol used by hosts and adjacent routers on IP networks to establish multicast group memberships. In yet another embodiment, the DVR server process within the middleware of the STB or RGW receives the multicast stream and records the encrypted packets to a disk file while indexing I-frame locations. Index and stream metadata information is written alongside the encrypted stream. In a further embodiment, the DVR server makes completed file available for playback and triggers middleware to display selection in the electronic program guide (EPG) and DLNA server catalog (if implemented).

The foregoing systems and methods and associated devices and modules are susceptible to many variations. Additionally, for clear and brief description, many descriptions of the systems and methods have been simplified. Many descriptions use terminology and structures of specific standards. However, the disclosed systems and methods are more broadly applicable.

Those of skill in the art will appreciate that the various illustrative logical blocks, modules, units, and algorithm steps described in connection with the embodiments disclosed herein can often be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular constraints imposed on the overall system. Skilled persons can implement the described functionality in varying ways for each particular system, but such implementation decisions should not be interpreted as causing a departure from the scope of the invention. In addition, the grouping of functions within a unit, module, block, or step is for ease of description. Specific functions or steps can be moved from one unit, module, or block without departing from the invention.

The various illustrative logical blocks, units, steps, components, and modules described in connection with the embodiments disclosed herein can be implemented or performed with a processor, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

The steps of a method or algorithm and the processes of a block or module described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium. An exemplary storage medium can be coupled to the processor such that the processor can read information from, and write information to, the storage medium. In the alternative, the storage medium can be integral to the processor. The processor and the storage medium can reside in an ASIC. Additionally, device, blocks, or modules that are described as coupled may be coupled via intermediary device, blocks, or modules. Similarly, a first device may be described a transmitting data to (or receiving from) a second device when there are intermediary devices that couple the first and second device and also when the first device is unaware of the ultimate destination of the data.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter that is broadly contemplated by the present invention. It is further understood that the scope of the present invention fully encompasses other embodiments that may become obvious to those skilled in the art and that the scope of the present invention is accordingly limited by nothing other than the appended claims.

The invention claimed is:

1. A method to protect digital content within a particular domain, the method comprising:
   receiving, from a source outside of the particular domain, the digital content at a first client device which is a set top box (STB), the received digital content being encrypted and in a first format;
   decrypting the received digital content to produce decrypted digital content in the first format at the first client device using a first key;
   transcoding the decrypted digital content in the first format to produce the digital content in a second format;
   re-encrypting the digital content in the second format using a second key,
   wherein the first client device derives the second key locally based on information received from a server; and
   transmitting the re-encrypted digital content in the second format to a second client device within the particular domain,
   wherein the second client device connects to the server to obtain a copy of the second key derived at the server and decrypts the re-encrypted digital content in the second format at the second client device.

2. The method of claim 1, wherein the second key is bound to devices within the particular domain.

3. The method of claim 1, wherein the second key is derived at least in part using a domain ID associated with the particular domain and the first key.

4. The method of claim 1, wherein the second key is derived at least in part using a time value and the first key.

5. The method of claim 1, wherein the information from which the first client device derives the second key includes information encrypted with the first key.

6. The method of claim 1, further comprising modifying copy control parameters associated with the digital content at the first client device.

7. The method of claim 1, wherein the information from which the first client device derives the second key includes control data received with the digital content at the first client device.

8. The method of claim 7, wherein the control data is an entitlement control message (ECM).

9. The method of claim 1, wherein first client device obtains the second key out of band.

10. The method of claim 1, further comprising embedding a watermark that is unique to the particular domain in the transcoded content by the first client device.

11. The method of claim 10, wherein the watermark includes information received from the server.

12. The method of claim 1, wherein the first key and the second key are derived on the first client device using a hardware-implemented mechanism including a unique key.

13. The method of claim 1, wherein the second client device decrypts the copy of the second key obtained from the server using a hardware-implemented mechanism including a unique key.

14. The method of claim 13, wherein the hardware-implemented mechanism is a key ladder.

15. The method of claim 1, wherein the first format and the second format have different bitrates.

16. The method of claim 1, wherein the server verifies the second client device's membership in the particular domain before allowing the second client device to obtain the second key.

17. A system for managing access to digital content, the system comprising:
   a first client device, which is a set top box (STB) belonging to a particular domain, configured to
      receive, from a source outside of the particular domain, the digital content, the received digital content being encrypted and in a first format,
      decrypt the received digital content using a first key to produce decrypted digital content in the first format,
      transcode the decrypted digital content in the first format to produce the digital content in a second format,
      derive a second key based on information received from a server,
      re-encrypt the digital content in the second format using the second key, and
      transmit the re-encrypted digital content in the second format; and
   a second client device belonging to the particular domain, configured to receive the re-encrypted digital content in the second format transmitted by the first client device,
   wherein the second client device connects to the server to obtain a copy of the second key derived at the server and decrypts the re-encrypted digital content in the second format.

18. The system of claim 17, wherein the first client device is a set-top box (STB) gateway including a digital video recorder (DVR).

19. The system of claim 17, wherein the second client device is a mobile device.

20. The system of claim 17, wherein server from which the second client obtains the second key is a video content authority system (VCAS).

21. A method to manage access to digital content within a particular domain, the method comprising:
   delivering the digital content, from a source outside of the particular domain, to a first client device which is a set top box (STB), the delivered digital content being encrypted and in a first format,
   wherein the first client device decrypts the received digital content in the first format using a first key to produce decrypted digital content in the first format and transcodes the decrypted digital content in the first format to produce the digital content in a second format;
   wherein the first client device re-encrypts the digital content in the second format using a second key and transmits the re-encrypted digital content in the second format, and
   wherein a second client device within the particular domain receives the re-encrypted digital content in the second format transmitted by the first client device and connects to a server to obtain the second key and decrypts the re-encrypted digital content in the second format,
   wherein the second key is derived by the first client device and by the server.

* * * * *